Figure 1:
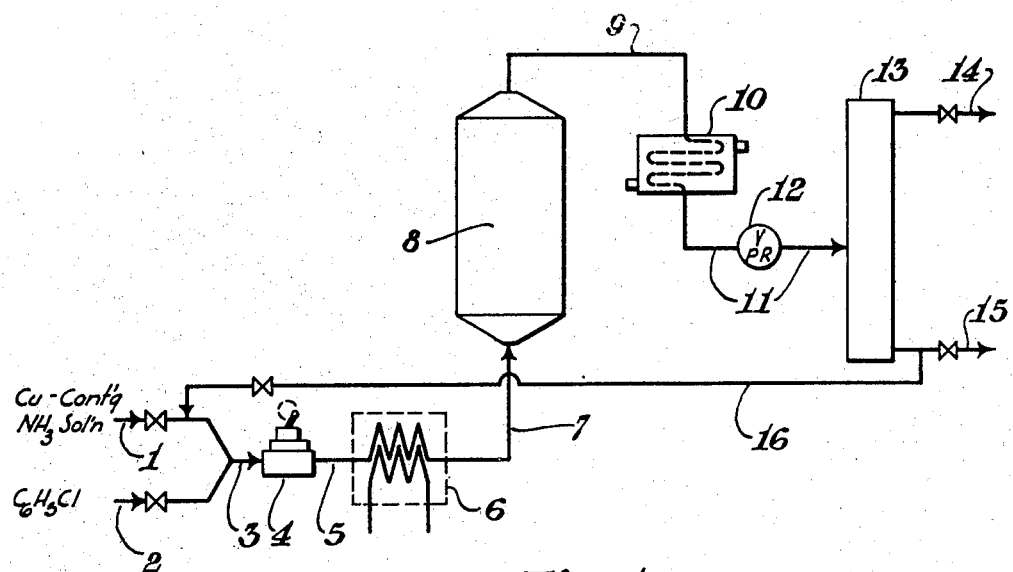

Dec. 16, 1947.    W. H. WILLIAMS ET AL    2,432,552
METHOD FOR PRODUCTION OF AROMATIC AMINES
Filed March 25, 1942

INVENTOR.
William H. Williams
Ray D. Holmes
Alexander H. Widiger Jr.
BY
*Griswold & Burdick*
ATTORNEYS Patented Dec. 16, 1947

2,432,552

UNITED STATES PATENT OFFICE 2,432,552

METHOD FOR PRODUCTION OF AROMATIC AMINES

William H. Williams, Ray D. Holmes, and Alexander H. Widiger, Jr., Midland, Mich., assignors to The Dow Chemical Company, Midland, Mich., a corporation of Delaware Application March 25, 1942, Serial No. 436,180

6 Claims. (Cl. 260—581)

This invention concerns an improved method for the production of aromatic amines, especially aniline. by the ammonolysis of halo-aromatic hydrocarbons. It particularly concerns a method for carrying out the ammonolysis reaction whereby the copper compounds employed as catalysts may be conserved and rendered more fully available for the purpose, and whereby certain operating difficulties such as the occurrence of excessive corrosion of the apparatus and loss of catalyst due to precipitation with consequent partial or complete plugging of the apparatus which have been particularly serious in past attempts to carry the reaction out in continuous manner may be avoided or overcome.

An important commercial method for the manufacture of aniline comprises heating chlorobenzene together with an aqueous solution of ammonia and a copper compound, usually a cuprous compound such as cuprous ammino chloride, to a reaction temperature above 150° C. with agitation in an autoclave. After completing the reaction the autoclave is cooled and discharged and the organic and aqueous layers thereof are separated. Dissolved organic ingredients are usually steam distilled from the aqueous layer and added to the organic layer, after which the latter is fractionally distilled or otherwise treated to recover the aniline and other organic products, e. g., diphenylamine, phenol, and any unreacted chlorobenzene.

The aqueous layer of the reacted mixture contains the ammonium chloride formed by the ammonolysis reaction and the catalytic copper compounds. The latter represent a considerable part of the cost of the chemicals employed, hence it is important that they be recovered in a form suitable for reemployment in the reaction. However, it is known that the ammonium chloride is corrosive to metal apparatus at the temperatures at which ammonolysis reactions are carried out and it has been taught that the presence of ammonium chloride reduces the catalytic activity of the dissolved copper compounds. Accordingly, it has heretofore been the practice to separate the copper compounds from the ammonium chloride solution, e. g., by adding sufficient alkali to precipitate the copper as its hydroxides or oxides, removing the precipitate and treating it with hydrochloric acid or other acid-acting agent to again form copper salts which are soluble in aqueous ammonia solutions. In recovering a cuprous compound from the reacted mixture it is important that it be protected from air so as to avoid as far as possible the formation of cupric compounds.

The usual batchwise method just described possesses certain disadvantages. It involves a number of operations, certain of which are manual, and there is considerable loss of time and heat due to the operations of heating the autoclave to the reaction temperature and of subsequently cooling it so that it may be opened and discharged. Also, the operations of opening and discharging the autoclave must be performed with care in order to avoid contact of workmen with the toxic aniline product or its vapors.

In U. S. Patent No. 1,607,824, and its Reissue, No. 17,280, it is taught that aniline may be prepared by passing the reaction mixture under pressure through a heated tubular autoclave. Although this teaching is true, serious difficulties are encountered when attempt is made to manufacture aniline in continuous manner by such method. The tubular autoclave is severely corroded by the reaction mixture even though it be constructed of a corrosion-resistant metal such as a chrome-nickel alloy steel. Also, a considerable part of the catalytic copper compounds is precipitated, apparently as copper oxides or hydroxides, and collects, together with the iron oxides formed by the corrosion, as a scale on the inner walls of the autoclave. The scale thus formed not only reduces the efficiency of the heating, but obstructs and eventually stops the flow of the reaction mixture through the autoclave. The loss of catalyst due to such scale formation is, of course, disadvantageous.

In a copending application of W. H. Williams et al., Serial No. 433,307, it is shown that the corrosion of apparatus which has occurred in prior attempts to carry the ammonolysis out in continuous manner may be lessened or substantially avoided by passing the reaction mixture through a heating zone wherein it is heated to the reaction temperature for a time less than is required for reaction of 10 per cent of the chlorobenzene, and passing the heated mixture, without further external heating and at a relatively low linear rate of flow, through a reaction zone wherein the reaction proceeds to the desired state of completion. Although excessive corrosion is thereby avoided, a considerable portion of the catalyst usually precipitates during passage through the heater with resultant loss of catalyst, reduced heat transfer efficiency and at least partial plugging of the apparatus.

It is an object of this invention to provide a method whereby: (1) a considerable part of the copper-containing catalyst may be recycled while dissolved in the aqueous phase of the reacted mixture, (2) the loss of catalyst and the operative difficulties due to the precipitation of copper compounds in the heating zone may be overcome or avoided, and (3) the reaction may, if desired, be carried out continuously without excessive corrosion occurring, while maintaining the catalyst largely in its most active form. Other objects will be apparent from the following description of the invention.

We have discovered, contrary to the accepted belief, that the presence of ammonium chloride has little or no effect upon the action of copper compounds in promoting ammonolysis reactions and that a considerable portion of the aqueous layer of a reacted ammonolysis mixture (which layer contains an ammonium halide and the dissolved catalyst) may advantageously be reemployed in the reaction for the formation of an aromatic amine. We have further found that such reemployment of the aqueous layer is advantageous in a number of respects. It permits direct re-use of the dissolved catalyst and avoids the usual extra steps for separating the catalyst from the ammonium halide dissolved therewith, which extra steps often result in partial oxidation, e. g. by air, of cuprous compounds to the less desirable cupric state. We also have found that the ammonium halide in the recycled aqueous layer satisfactorily redissolves any copper compounds precipitated in a prior cycle of the process and that it therey aids in freeing the apparatus of scale. In this connection it may be mentioned that the recycled liquor appears to attack the copper-containing scale before, or more rapidly than, it attacks the apparatus. In some instances the aqueous layer may advantageously be recycled alone, i. e. without addition of the usual reactants, for purpose of dissolving copper-containing scale from the apparatus. As a corollary to the facts just stated, we have further oserved that the ammonium halide in the recycled aqueous layer restricts and often completely prevents precipitation of dissolved copper compounds in the reaction system, particularly in the zone of external heating.

We have further found that the corrosive action of ammoniacal aqueous ammonium halide solutions toward iron and steel increases with decrease in the molecular ratio of ammonia to the ammonium halide therein and that by replenishing the recycled aqueous portion of a reacted ammonolysis mixture with ammonia, the recycled liquor may be rendered nearly, if not entirely, non-corrosive to the metal apparatus. Thus, the corrosive action of an ammonolysis mixture appears to be due in part to the consumption of ammonia with formation of an ammonium halide, and this corrosive action may be reduced or avoided by resaturating the aqueous phase of the mixture with ammonia.

The invention then consists essentially in a process for carrying out ammonolysis reactions wherein at least a portion of the aqueous layer of a reacted ammonolysis mixture is recycle, alone or together with the added reactants, through the reaction system and particularly through the zone of external heating. As hereinbefore pointed out, this novel practice not only results in conservation of the catalyst, but also prevents the formation of a copper-containing scale within the heating zone and/or removes such scale if formed. In practicing the invention in continuous manner it is necessary that only a portion of the aqueous layer be recycled, since if all of said layer were recycled excessive amounts of ammonium chloride would accumulate in the reaction system. The dissolved copper compounds may advantageously be separated in usual ways from the portion of the aqueous liquor that is not recycled and be added to the liquor which is recycled.

The accompanying drawing illustrates diagrammatically certain forms of apparatus which may be employed in practicing the invention in continuous manner and indicates the flow of materials through such apparatus. In Fig. 1 of the drawing, the numerals 1 and 2 designate valved inlets, each of which connects with a line 3 leading to a pump 4. The latter is connected by line 5 with a heater 6, which in turn is connected by a line 7 with the lower end of a reactor 8. The reactor 8 may be constructed of usual structural metals, e. g. iron, steel, or alloy steels, etc. It may be of any of various shapes or forms, e. g. tubular, spherical, or egg-shaped, etc. A line 9 leads from the upper end of reactor 8 to a cooling device 10. The latter is connected by a line 11, which is provided with a relief valve 12, to a continuous separator 13. The separator 13 is provided toward its top with an outlet line 14, which connects with a still or other usual apparatus (not shown) for separating the organic products. Near its lower end the separator 13 is provided with a valved outlet line 15 which connects with apparatus (not shown) for recovering the valuable ingredients from the aqueous liquor. A valved line 16 branches from line 15 and connects with the inlet line 1.

Figure 2:
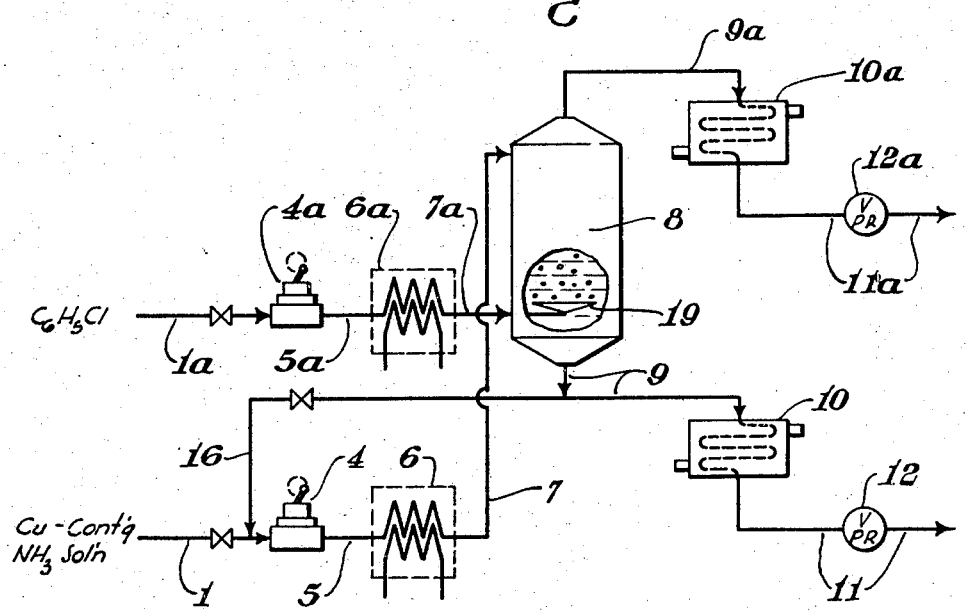

In Fig. 2 of the drawing the numerals 1 and 1a designate valved inlets which connect with the respective pumps 4 and 4a. Pump 4 is connected by a line 5 with a heater 6 and pump 4a is likewise connected by a line 5a with a heater 6a. A line 7 leads from the heater 6 and connects with the reactor 8 near the top of the latter. A line 7a leading from heater 6a passes through the wall of reactor 8 and terminates in a distriutor head 19 situated in the lower portion of the reactor. A line 9 leading from the lower end of the reactor 8 connects with a cooling device 10, which is provided with an outlet line 11 having a relief valve 12 situated therein. A valved line 16 branches from line 9 and connects with the inlet line 1. A line 9a leads from the top of reactor 8 and connects with cooling device 10a. The latter is provided with an outlet line 11a having a relief valve 12a situated therein.

In producing aniline in accordance with the invention using the apparatus illustrated in Fig. 1, chlorobenzene is introduced through inlet 2 and an aqueous solution of ammonia and a copper compound, e. g. cuprous oxide, cuprous chloride, cuprous bromide, or cuprous sulphate, etc., is introduced through inlet 1, the two liquors passing in admixture through the common line 3 to the pump 4. In place of the cuprous compounds just mentioned corresponding cupric compounds may, though usually less satisfactorily, be employed. The proportions and concentrations of the reactants and catalyst may be varied widely and are the same as may be used in the well known batch process for carrying out the reaction. Usually 3 moles or more of ammonia in the form of an aqueous solution of 20 per cent concentration or higher and between 0.1 and 0.2 atomic weight of copper in the form of a cuprous compound are used per mole of chlorobenzene.

The mixture is forwarded by the pump through the heater 6, wherein it is heated to a reaction temperature above 170° C. and preferably between 180° and 220° C. at a pressure equal to or greater than its vapor pressure. The rate of flow through the heater is such that not more than 10 per cent of the chlorobenzene is consumed while in the zone of external heating. During passage through the heater a portion of the copper-containing catalyst usually precipitates and collects as a scale on the walls of the heater, but sufficient catalyst is usually retained in solution to effect the desired ammonolysis reaction.

The mixture flows from the heater through line 7 into the reactor 8 and flows upward within the latter at a relatively low linear rate, i. e. at a rate of flow corresponding to a Reynolds' number of less than 200,000 and preferably less than 125,000. The rate of flow through the reaction zone may be very sluggish, if desired. Although the mixture preferably is not heated externally during flow through the reactor, the temperature usually rises spontaneously, e. g. by as much as 10° to 70° C., due to heat generated by the ammonolysis reaction.

The mixture flows from the reactor through line 9 to the cooling device 10, where it is cooled to below the reaction temperature and usually to below 100° C., and thence through line 11 and relief valve 12 to the separator 13, wherein the aqueous and organic layers of the reacted mixture are separated. The organic layer is withdrawn through outlet 14 for further processing, e. g. distillation to separate the aniline and other organic products.

The aqueous layer contains the ammonium chloride formed in the reaction and the dissolved ammonolysis catalyst. It flows from the separator 13 through lines 15 and 16. A substantial portion, e. g. at least 10 per cent and usually between 15 and 60 per cent, of the aqueous solution is returned through line 16 to the inlet line 1, where it is enriched with the inflowing ammonia and is recycled. As hereinbefore mentioned, enrichment of the recycled liquor with ammonia not only favors the desired ammonolysis reaction but also reduces the corrosive action of the liquor on the metal apparatus. Ammonia is preferably introduced through inlet 1 in amount and concentration sufficient so that the solution formed upon mixing of the same with the recycled liquor contains at least 15 per cent by weight and preferably more than 20 per cent of ammonia, based on the combined weight of ammonia and water present. During flow through the heater 6, the liquor dissolves any copper-containing scale present in the heating unit. Once the cyclic process is in continuous operation the precipitation of copper compounds in the heater usually ceases. However, if, due to improper or accidental adjustments of the flow, scale does develop it may be desirable to interrupt inflow of the reactants and to recycle only the aqueous layer of the reacted mixture through the apparatus so as to assure removal of any copper-containing scale from the latter. The copper-containing scale, upon being dissolved by the recycled liquor, is converted into soluble copper compounds, e. g. cuprous ammino chloride, which are effective in catalyzing the ammonolysis reaction.

A portion of the aqueous layer of the reacted mixture is continuously withdrawn through outlet 15 so as to avoid accumulation of an excessive amount of ammonium chloride in the reaction system. The copper compounds in the withdrawn liquor may be recovered therefrom, e. g. by evaporation to crystallize the ammino copper salt from the solution or by adding sufficient of an alkali such as sodium or potassium hydroxide or a corresponding carbonate to precipitate the copper as the hydroxide or oxide. The recovered copper compounds may be added directly to the portion of the aqueous layer which is being recycled and thus be returned to the reaction. After removing the dissolved copper compounds from the portion of the aqueous layer which is withdrawn from the reaction system, this liquor may of course be evaporated to crystallize the ammonium chloride therefrom.

In preparing aniline using the apparatus shown in Fig. 2 of the drawing, an aqueous solution of ammonia and a copper compound, e. g. cuprous ammino chloride, is introduced through inlet 1 to pump 4, from which it flows under pressure through line 5, heater 6, and line 7 into the reactor 8, filling the latter and flowing slowly downward within the reactor. While continuing such flow, chlorobenzene is introduced through inlet 1a, pump 4a, line 5a, heater 6a, line 7a and the distributor head 18 into the lower section of the reactor 8, and due to its relatively low density at the reaction temperature, it flows counter to the downflowing aqueous ammonia solution, reacting with the latter to form the aniline product. The rates of flow are, of course, restricted sufficiently so that the organic products collect as a layer in the upper end of the reactor and the aqueous phase of the mixture collects as a distinct layer toward the bottom of the reactor. It may be mentioned that in passing through heater 6a the chlorobenzene is heated to a temperature of at least 200° C., and that, if desired, a large part of the heat required to start the ammonolysis reaction may be provided by said heater.

The organic products flow from reactor 8 through line 9a to the cooling device 10a, wherein they are cooled, usually to below 100° C., and thence through line 11a and relief valve 12a to a still or other usual apparatus (not shown) for separating the organic products.

The aqueous phase of the reacting mixture flows from the reactor through line 9, a considerable portion thereof, e. g. between 15 and 60 per cent of the solution, being withdrawn from line 9 through the valved line 16 and returned to the inlet line 1. The remainder of the aqueous phase of the mixture flows from line 9 through the cooling device 10 and thence through line 11 and relief valve 12 to apparatus (not shown) for recovering the copper compounds and ammonium chloride from this portion of the liquor. The recovered copper compounds may be introduced together with the ammonia solution through inlet 1.

By operating in this manner a considerable portion of the catalyst is recycled continuously while in solution and the recycled liquor serves to prevent the precipitation of catalyst in the heater 6 and thus avoids the loss of catalyst and the operating difficulties which occur when such precipitation takes place.

Although the invention is advantageously carried out in either of the ways above described, it is not restricted thereto. The step of recycling a considerable portion of the aqueous phase of the reacted mixture may advantageously be applied when producing aniline in the usual batch-wise manner, or when producing aniline by passing the ammonolysis mixture through a heated tubular autoclave.

The invention may be applied with advantage in carrying out other ammonolysis reactions for the production of arylamines. For instance, it may be applied in reacting ammonia with methyl-chlorobenzene to produce toluidine; in reacting ammonia with ethyl-chlorobenzene to produce aminoethylbenzene; or in reacting ammonia with bromobenzene to produce aniline, etc.

The following example illustrates one way in which the principle of the invention has been applied, but is not to be construed as limiting the invention.

A mixture of chlorobenzene and a cuprous chloride-containing concentrated aqueous ammonia solution in the proportions of about 3 moles of ammonia and 0.1 mole of dissolved cuprous chloride per mole of chlorobenzene was pumped under a pressure exceeding the vapor pressure of the mixture into a tubular heater wherein the mixture was heated to a temperature of about 200° C., and thence through a reactor wherein the linear rate of flow was such as to correspond to a Reynolds' number of about 26,000. The mixture flowed from the reactor through a cooler, and thence through a valve for reducing the pressure, to a continuous separator, where the two layers of the mixture were separated. The organic layer was distilled to separate the usual products, e. g. aniline and diphenyl amine, etc., and the aqueous layer was reserved for further processing. During operation it was noted that the pressure drop through the heater increased steadily from an initial value of about 150 pounds per square inch until it was approximately 400 pounds per square inch. Thereupon introduction of the reaction mixture was discontinued and instead the aqueous layer of the reacted mixture was pumped through the reaction system for about 3 minutes, while continuing operation of the heater. Introduction of the reaction mixture was then resumed. The pressure drop through the heater was approximately the same as at the start of the reaction, i. e. about 150 pounds per square inch, indicating the the recycled liquor had dissolved an obstruction in the heater. Little, if any, corrosion of the apparatus occurred.

Other modes of applying the principle of the invention may be employed instead of those explained, change being made as regards the method herein disclosed, provided the step or steps stated by any of the following claims or the equivalent of said stated step or steps be employed.

We therefore particularly point out and distinctly claim as our invention:

1. In a method wherein aniline is produced by heating a halobenzene together with an aqueous solution of ammonia and a copper compound, the latter initially being present within the limits of its solubility in the aqueous solution, to a reaction temperature at superatmospheric pressure, the steps which consist in replenishing a portion corresponding to at least 10 per cent of the aqueous phase of the reacted mixture with ammonia in amount sufficient to form an aqueous ammonia solution of greater than 20 per cent concentration and heating the resultant solution under the pressure and in the substantial absence of air together with a halobenzene to produce additional aniline.

2. In a method wherein an aromatic amine is produced by passing a mixture of a halobenzene and an aqueous solution of ammonia and a copper compound, the latter initially being present within the limits of its solubility in the aqueous solution in continuous flow through a reaction system wherein it is heated to a reaction temperature at a pressure at least equal to its vapor pressure, the steps which consist in separating from 10 to 60 per cent of the aqueous layer of the reacted mixture, enriching it with ammonia in amount sufficient to form an aqueous ammonia solution of greater than 20 per cent concentration, and returning the enriched aqueous liquor to the reaction while excluding air from the reaction zone.

3. In a method for the production of aniline wherein chlorobenzene is passed together with an aqueous solution of ammonia and a cuprous compound, the latter initially being present within the limits of its solubility in the aqueous solution, through a reaction system in which the mixture is heated to a reaction temperature at a pressure greater than its vapor pressure, the steps which consist in separating a portion corresponding to at least 10 per cent of the aqueous phase of the reacted mixture, enriching it with ammonia in amount sufficient to form an aqueous ammonia solution of greater than 20 per cent concentration and returning the enriched aqueous liquor to the reaction while excluding air from the reaction zone.

4. A method for the production of aniline which comprises passing chlorobenzene and an aqueous solution of ammonia and a cuprous compound, the latter initially being present within the limits of its solubility in the aqueous solution, through a heating zone wherein it is heated in the substantial absence of air under a pressure greater than its vapor pressure to a reaction temperature above 180° C. for a time less than is required for reaction of 10 per cent of the chlorobenzene, passing the heated mixture without further external heating through a reaction zone at a rate corresponding to a Reynolds' number of less than 200,000, causing the mixture to separate into distinct layers as it flows from the reaction zone, and returning a portion corresponding to at least 10 per cent of the aqueous layer to the first of the foregoing steps.

5. In a method for the production of aniline, the steps which consist in passing a mixture of chlorobenzene and an aqueous solution of ammonia and a cuprous compound, the latter initially being present within the limits of its solubility in the aqueous solution, through a heating zone wherein it is heated in the substantial absence of air to a reaction temperature at a pressure greater than its vapor pressure for a time less than is required for reaction of 10 per cent of the chlorobenzene, and thence through a reaction zone without further external heating at a rate of flow corresponding to a Reynolds' number of less than 125,000, causing the mixture to separate into layers as it flows from the reaction zone, enriching from 10 to 60 per cent of the aqueous layer with ammonia and returning the enriched portion of the aqueous layer to the first of the foregoing steps.

6. In a method for producing aniline, the steps which consist in passing chlorobenzene and an aqueous solution of ammonia and a cuprous compound in countercurrent manner through a reaction zone in the substantial absence of air while at a reaction temperature above 200° C. and at a pressure greater than the vapor pressure of the mixture, separately withdrawing from the reaction zone the organic and aqueous phases of the reaction mixture, enriching from 10 to 60 per cent of the aqueous phase with ammonia in amount sufficient to form an aqueous ammonia solution of greater than 20 per cent concentration, and returning the enriched aqueous portion of the reacted mixture to the reaction while excluding air from the reaction zone.

WILLIAM H. WILLIAMS.
RAY D. HOLMES.
ALEXANDER H. WIDIGER, JR.

REFERENCES CITED

The following references are of record in the file of this patent:

UNITED STATES PATENTS

| Number | Name | Date |
|---|---|---|
| Re. 17,280 | Hale et al. | Apr. 23, 1929 |
| 1,833,485 | Griswold | Nov. 24, 1931 |

OTHER REFERENCES

Groggins et al., Jour. Ind. and Eng. Chemistry, vol. 25, pp. 42–49 (Jan. 1935).